United States Patent [19]

Piesch et al.

[11] Patent Number: 4,588,898

[45] Date of Patent: May 13, 1986

[54] APPARATUS FOR MEASURING DOSE ENERGY IN STRAY RADIATION FIELDS

[75] Inventors: Ernst Piesch, Eggenstein-Leop.; Bertram Burgkhardt, Karlsruhe, both of Fed. Rep. of Germany

[73] Assignee: Kernforschungszentrum Karlsruhe GmbH, Karlsruhe, Fed. Rep. of Germany

[21] Appl. No.: 498,220

[22] Filed: May 24, 1983

[30] Foreign Application Priority Data

May 25, 1982 [DE] Fed. Rep. of Germany ....... 3219537

[51] Int. Cl.$^4$ ................................................ G01T 3/00
[52] U.S. Cl. .................................................... 250/390
[58] Field of Search ........................... 250/390, 391, 392

[56] References Cited

U.S. PATENT DOCUMENTS

| | | | |
|---|---|---|---|
| 3,932,758 | 1/1976 | Burghardt et al. | 250/391 |
| 4,074,136 | 2/1978 | Heinzelmann et al. | 250/390 |
| 4,100,414 | 7/1978 | Distenfeld | 250/391 |

OTHER PUBLICATIONS

W. G. Alberts et al., "European Workshop on Neutron Dosimetry for Radiation Protection", Physikalisch-Technische Bundesanstalt, Report ND-17, Braunschweig 1979, pp. 1-43.
R. S. Sanna et al., "Neutron Measurement Inside PWR Containments", Environmental Measurements Laboratory, U.S. Department of Energy, Report EML-379, 1980, pp. 1-36.
G. Venkataram et al., "Study of Design Parameters for a Neutron Detector Using Silicon Detectors", Proc. 4th Eurtom. Symp. Neutron Dosimetry, vol. 1, pp. 633-639, 1981.

Primary Examiner—Alfred E. Smith
Assistant Examiner—Carolyn E. Fields
Attorney, Agent, or Firm—Spencer & Frank

[57] ABSTRACT

An apparatus for measuring dose equivalent, absorbed dose and neutron fluence in stray radiation fields of neutron source. The apparatus includes a moderator sphere having an outer surface and a neutron detector disposed in the center of the moderator sphere for producing a counting rate representing a measure of thermal neutrons in the center of the sphere. In addition, at least one detector combination is disposed at the outer surface of the moderator sphere. The detector combination includes a plurality of neutron detectors and a shield for providing each respective detector in the plurality of detectors with a different shielding absorption of thermal neutrons. The detectors of the detector combination produce count rates which can be used to separately measure albedo neutrons back-scattered by the moderator sphere and incident thermal neutrons from the stray radiation field.

6 Claims, 6 Drawing Figures

Fig. 5: On-line computer assisted evaluation of TLD-detectors and estimation of neutron field data using the single sphere albedo technique.

APPARATUS FOR MEASURING DOSE ENERGY IN STRAY RADIATION FIELDS

BACKGROUND OF THE INVENTION

The present invention relates to a device for measuring the neutron dose equivalent in stray radiation fields by means of neutron detectors and a moderator sphere in the center of which there is disposed one of the detectors for detecting thermal neutrons.

In the field of radiation protection monitoring there exists the task of measuring the dose equivalent of neutrons in stray neutron radiation fields. Devices for measuring the dose equivalent preferably comprise a spherical polyethylene moderator having a diameter of 30 to 16 cm, in the center of which there is disposed a thermal neutron detector, e.g. a $BF_3$ counting tube, an LiI scintillation counter or a $^3$He counting tube. The indication of the neutron dose equivalent is independent of energy in a first approximation within the energy range of thermal neutrons up to 20 MeV. The response of an dose equivalent meter, however, is greater by up to a factor of 4 or 8, respectively, in the energy range of intermediate neutrons compared to a response in connection with fast neutrons (Alberts, W. G. et al, "European Workshop on Neutron Dosimetry for Radiation Protection" Physikalisch-Technische Bundesanstalt, Report ND-17, Braunschweig 1979).

In order to estimate the neutron dose equivalent more independent of the neutron energy spectroscopic measuring methods also are applied which employ $^3$He or recoil counters or a number of 7 to 15 polyethylene spheres having different diameters (multisphere measuring technique). An accurate determination of the neutron dose equivalent results from multiplication of the neutron fluence in a partial energy range with the respective neutron fluence-to-dose equivalent conversion factor. See, for example, Sanna, R. S. et al, "Neutron Measurements Inside PWR Containments", Environmental Measurements Laboratory, U.S. Department of Energy, Report EML-379, 1980. These methods, however, are very complicated and cannot be used routinely for measuring the neutron dose at reactors or accelerators.

SUMMARY OF THE INVENTION

It is an object of the present invention to provide a device which, in contradistinction to the multisphere measuring technique, employs only one moderator sphere and has, in addition to a detector in the center of the sphere, further detector combinations at the surface of the sphere so that relatively small values of the neutron dose equivalent can be detected at various locations, and locus dependent calibration factors can be obtained.

The above and other objects are accomplished by the present invention wherein an apparatus is provided for measuring dose in stray neutron fields in the environment of nuclear reactors, accelerators and neutron sources. The apparatus includes a moderator sphere having an outer surface with a neutron detector disposed in the center of the moderator sphere for producing a signal representing a measure of thermal neutrons in the center of the sphere. In addition, at least one detector combination is disposed at the outer surface of the moderator sphere. The detector combination includes a plurality of neutron detectors and a shielding device for providing each respective detector in the plurality of detectors with a different shielding for the absorption of thermal neutrons. The detectors of the detector combination produce signals which can be used to separately measure albedo neutrons back-scattered by the moderator sphere and incident thermal neutrons from the stray radiation field.

Preferably the detector combination includes three neutron detectors each with different shielding as mentioned above. By giving a different function for the energy response of each of the four individual detectors (those in the detector combination plus the detector at the center of the moderation sphere) it is thus possible to separately determine measured contributions for the energy ranges of thermal neutrons (<0.5 eV), intermediate neutrons (0.5 eV–10 keV) as well as fast neutrons (10 keV–10 MeV). With passively accumulating LiF thermoluminescence dosimeters it has been possible to demonstrate that the single sphere albedo measuring technique in stray neutron radiation fields permits an accurate determination of the neutron dose; and in addition to the dose equivalent contributions, it is also possible to determine an effective neutron energy for the energy range of fast neutrons.

DESCRIPTION OF THE PREFERRED EMBODIMENT

Figure 1:
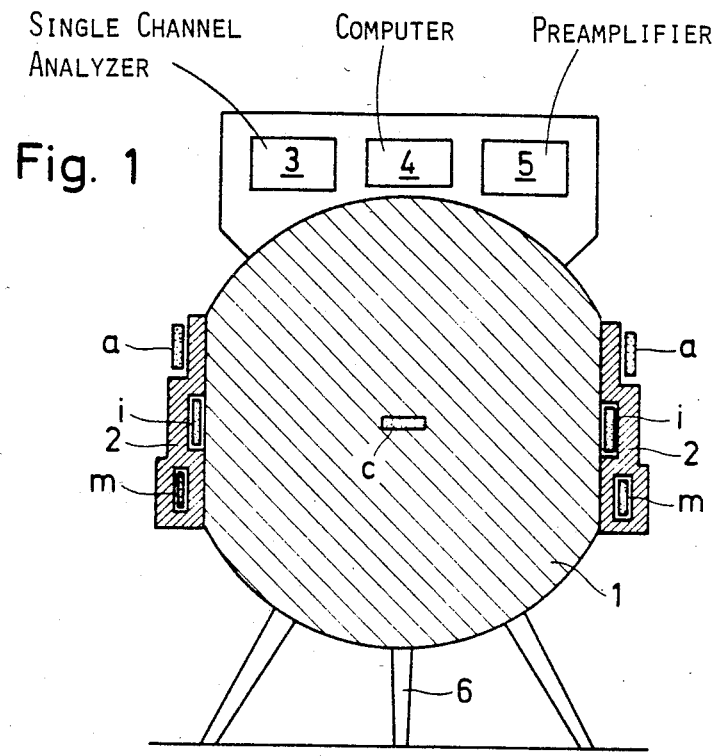
FIG. 1 is a partially cross-sectional, partially schematic, view of a dosimeter according to the invention.

FIG. 1 shows a moderator sphere 1 which is preferably made of polyethylene. A neutron detector c is disposed in the center of sphere 1 for detecting thermal neutrons and two detector combinations each including neutron detectors a, i, and m both are arranged diametrically opposite one another on the surface of sphere 1. Detector i receives albedo neutrons while detectors a and m are held by a boron platic shield 2 whose thickness and configuration differs from the region of one detector to another. In the normal case, two such detector combinations are arranged at the front and rear of the moderator sphere diametrically opposite one another with respect to the center of the moderator sphere. Moderator sphere 1 as well as the detector combination or, in the case of two detector combinations, each detector combination, and an entire electronic evaluation system including a single channel analyzer 3, a computer/computer display 4 (for example a microprocessor) and a preamplifier 5, are all supported by a frame 6 which assures sufficient mobility for the device.

Figure 2:
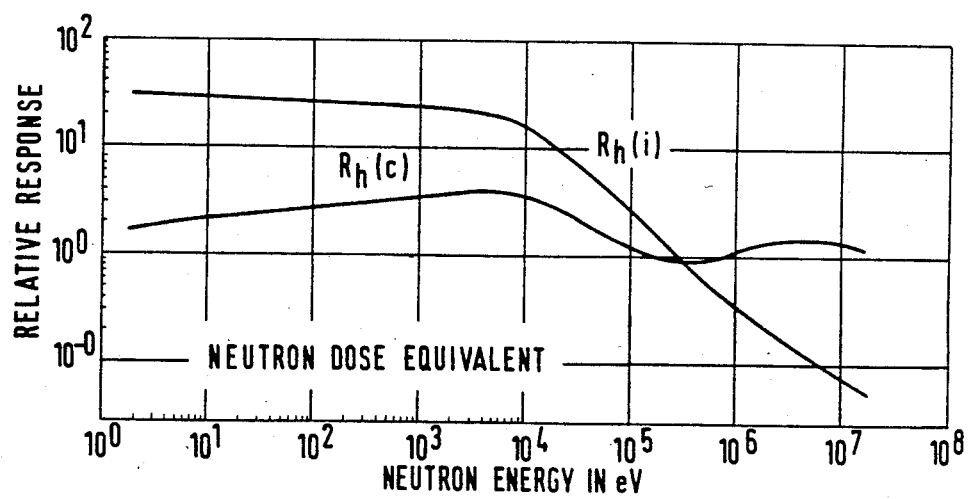
FIG. 2 is a graph showing the relative dose equivalent response for detectors i and c of the dosimeter of FIG. 1 as a function of neutron energy.
Figure 3:
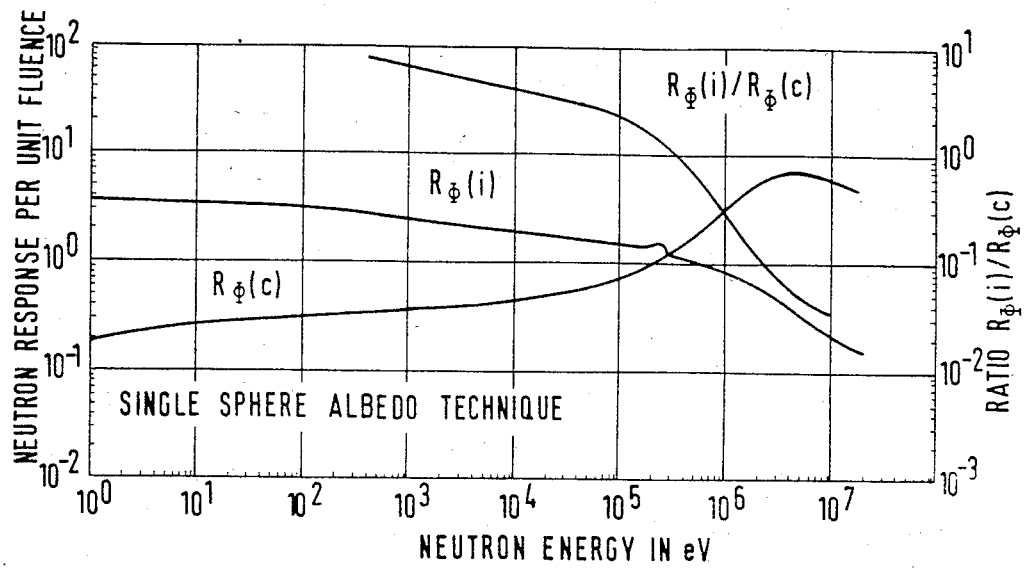
FIG. 3 is a graph showing the neutron fluence response of each of the detectors i and c of FIG. 1 as well as the ratio of the neutron fluence response of detectors i and c.

The dose equivalent response of albedo detector i, which is dependent on energy in the energy range of fast neutrons, can be corrected if the effective neutron energy is known. For this purpose the ratio of the measured values of the detector displays is utilized. The corresponding energy dependence of the response is shown in FIG. 2 for detectors i and c (where $R_h(c)$ and $R_h(i)$ are the dose equivalent response for detectors i and c as a function of neutron energy). The neutron fluence response as a function of the neutron energy for detectors i and c as well as for the measured value ratio for detectors i and c is shown in FIG. 3. This response was determined by irradiation with thermal neutrons of 2 keV and 24 keV at the reactor and above 50 keV to 19 MeV at the accelerator of the Physikalisch Technische Bundesanstalt (Federal Institute for Physics and Technology) in Braunschweig, Federal Republic of Germany.

For a determination of the measured values of interest, an on-line computer program is used. This program corrects, among other things, the directional dependency of the response function. This is done with the utilization of the respective measured value ratios (discussed below) of each of the front and rear detectors a, m and i.

For routine use in radiation protection there exists the task of detecting relatively small neutron dose equivalent of less than 10 $\mu$Sv/h at various locations to thus obtain locus dependent calibration factors for the albedo dosimeter, primarily for use of such albedo neutron dosimeters in personnel monitoring. Instead of using accumulating detectors, experiments have been made regarding the possible use of counting tubes and semiconductor detectors for the detection of neutrons. See, for example, Venkataram, G. et al, "Study of Design Parameters for a Neutron Detector Using Silicon Detectors", Proc. 4th Eurtom. Symp. Neutron Dosimetry, Vol. 1, pp. 633–639, 1981. The silicon semiconductor detectors exhibit favorable properties with respect to small detector size, good gamma discrimination and low operating voltage. However, with the prior art measuring method there described it is not possible to determine the neutron fluence independently of energy and to determine the quality factor Q and the corresponding neutron fluence to dose equivalent conversion factors h for the respective neutron stray radiation field. The energy independence of the fluence response of the detectors i and c is shown in FIG. 3.

Figure 4:
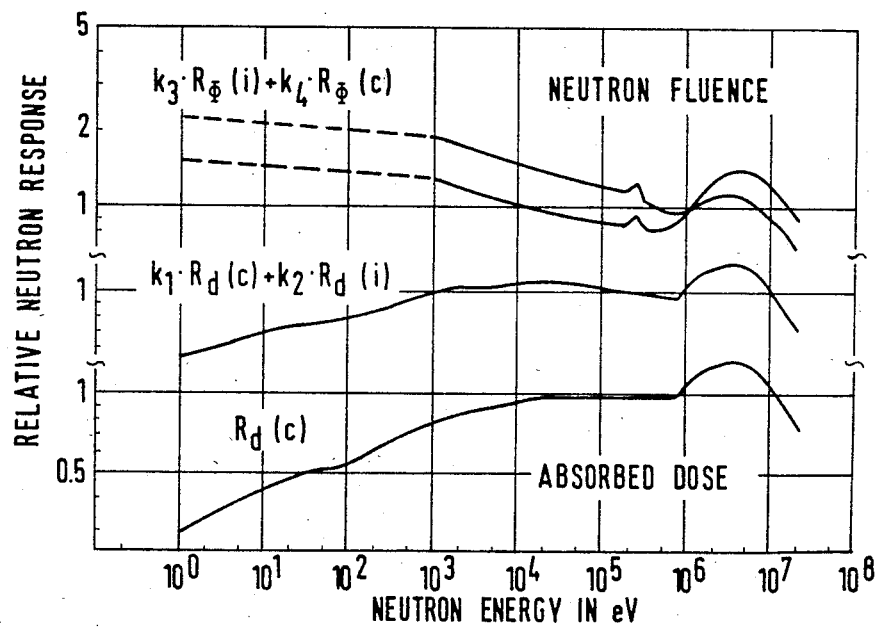
FIG. 4 is a graph showing for the estimation of neutrofluence and absorbed dose the relative neutron response as a function of neutron energy based on the linear combination of the detector reading for detector c and i.

Starting with the experimentally found calibration functions, it can be demonstrated that, with the aid of a linear combination of measured values produced by detectors i and c, it is possible to make an energy independent determination of the neutron fluence as well as of the absorbed dose D to within about ±20%, at least in the energy range between 10 keV and 10 MeV. The single sphere albedo measuring technique according to the invention offers an opportunity to determine the radiation field quantities $\phi$ (neutron fluence), D (neutron absorbed dose), and H (neutron dose equivalent) as well as, with the aid of the ratio of the meaasured value displays, the neutron fluence-to-dose conversion factors $d = D/\phi$ and $h = H/\phi$ and the quality factor $Q = H/D$. Reference is made to FIG. 4 which shows the linear combination of the dosimeter display for detectors c and i as a function of the neutron energy for determining the absorbed dose D with $k_1 = 0.0952$ and
$k_2 = 0.0051$, as well as the neutron fluence with
$k_3 = 0.48 \cdot 10^8$ and $k_{41} = 0.175 \cdot 10^8$ as well as for
$k_{32} = 0.72 \cdot 10^8$ and $k_{42} = 0.118 \cdot 10^8$.

$k_1$ to $k_{42}$ are constants and the result of a least squares fit using the experimental energy response function of the detector c and i (FIG. 3) and the linear combination of the detector readings presented in FIG. 4.

Thus, the four detectors (a, c, i, m) of the active single sphere albedo dosimeter system according to the invention differ in their response with respect to thermal and intermediate neutrons. These detectors a, c, i, and m are preferably $^3$He counters or proportional counters having an $N_2$ component or silicon surface barrier detectors using additional (n,$\alpha$) converters at the surface of the detector, converters which contain $^6$Li or $^{10}$B preferably have a higgh response for thermal neutrons.

The individual detectors accomplish the following:

detector c is disposed in the center of sphere 1 and meaasures primarily thermal neutrons which have been moderated in the polyethylene.

detector i (albedo detector) is covered by a boron plastic absorber 2 on the side facing the radiation source and preferably measures thermal and epithermal neutrons, respectively, which after appropriate moderation and back scattering, emanate from the surface of moderator sphere 1;

detector m is covered on all sides with parts of boron plastic absorber 2 for thermal neutrons and measures incident epithermal neutrons from the stray radiation field and from moderator sphere 1, respectively;

detector a is covered by parts of boron plastic absorber 2 on the side facing moderator sphere 1 and measures primarily incident thermal neutrons from the stray radiation field.

With the electronic system comprising elements 3, 4 and 5 (FIG. 1), the corresponding counting rates of the respective dectectors at the front and rear of moderator sphere 1 are added, i.e., $\alpha = \alpha_v + \alpha_r$, where $\alpha$ is the counting rate for each of detectors i, a and m. The built-in microprocessor 4 stores the counting rates of the four detectors a, c, i, m and calculates separately, on the basis of stored calibration curves, the neutron dose equivalent proportions for thermal neutrons $H_{th}$ from the indication of detectors a and m, for epithermal neutrons $H_e$ from the indication of detector m and for fast neutrons $H_f$ from the indication of detector c on the basis of the counting rate ratio $\alpha_f(i)$ and $\alpha_f(c)$ derived from the counting rate of the detectors i and c after subtraction of the count rate contributions of thermal and epithermal neutrons. These calculations are based on the following equation systems:

$$\alpha(k) = \alpha_{th}(k) + \alpha_e(k) + \alpha_f(k)$$

$$\alpha(k) = R_{\phi,th}(k) \cdot \phi_{th} + R_{\phi,e}(k) \cdot \phi_e + R_{\phi,f}(k) \cdot \phi_f$$

where $\alpha(k)$ are the readings of detectors k, where k indicates detectors i, a, m and c, respectively; $\phi_{th}$, $\phi_e$ and $\phi_f$ are the neutron fluence components of thermal, epithermal and fast neutrons and $R_{\phi,th}(k)$, $R_{\phi,e}(k)$ and $R_{\phi,e}(k)$ indicate the fluence response function for the thermal, epithermal and fast neutrons of the detectors k which depend on neutron energy.

Microprocessor 4 preferably includes a triple display for selectively displaying the counting rate of the dose equivalent components. From the measured value ratio $a_r/a_v$ information can be obtained, if the counting rates are stored separately, regarding the direction of beam impingement. With a given linear combination of the detector readout i and c, it is possible to calculate the quantities $\phi$ and D, and thus also d, h and Q. These values can be displayed directly if there is an appropriate read-out or can be stored on magnetic tape via a measured value recording to be printed out at a later time on a table-model calculator. For a determination of the calibration factor of albedo dosimeters, the response of the albedo detector $a(i)/H$ is indicated.

A device of the single sphere albedo measuring system makes use of passive thermoluminescence detectors, i.e. pairs of $^6$LiF and $^7$LiF (TLD600 and TLD700) detectors, in the center of a polyethylene sphere of 30 cm diameter (detector c) and inside two boron-loaded plastic encapsulations of the Karlsruhe albedo neutron dosemeter (Burgkhardt, B. and Piesch E., Method and Apparatus for Determining the dose value for neutrons, U.S. Pat. No. 3,932,758, Jan. 13, 1976) disposed at the front and rear locations at the surface of the moderator sphere.

Figure 5:
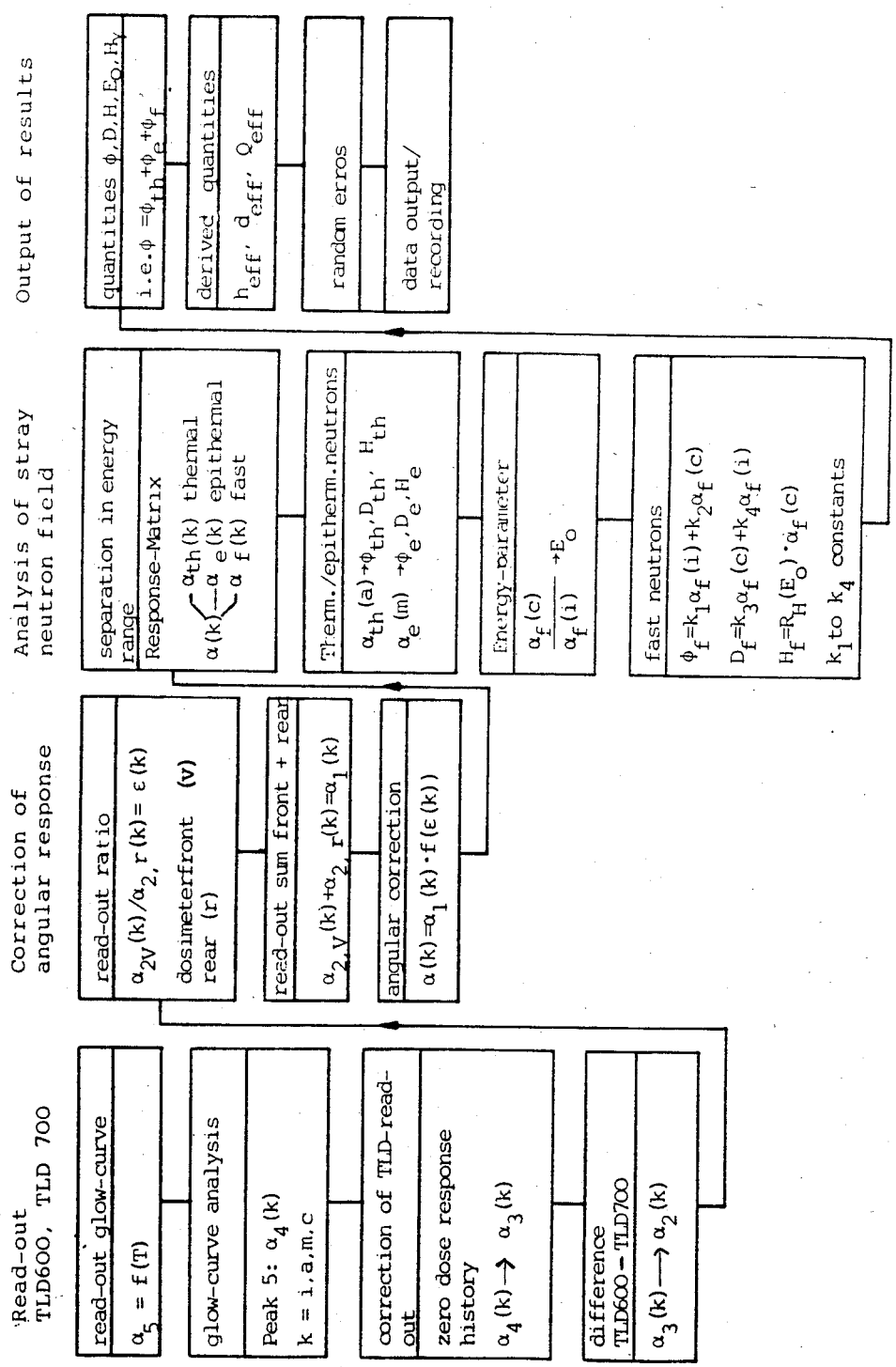
FIG. 5 is a programming flow diagram illustrating the on-line computation of neutron field data for a single sphere albedo system using passive thermoluminescence detectors.

The on-line computer program (FIG. 5) serves for the evaluation of the TLD detectors, the separation of the γ-dose contribution using the difference in the readout $a$ of the TLD600 and TLD700 detectors, the correction of the angular response of the detectors in the albedo dosemeters, the correction of the energy response by splitting up the energy range in three groups of thermal, epithermal and fast neutrons and data output/storage. The set of simultaneous equations (page 11) is solved by the computer program taking into account constant response values for thermal and epithermal neutrons and the read-out contribution $a_f(k)$ for fast neutrons (see also equations in FIG. 5).

Figure 6:
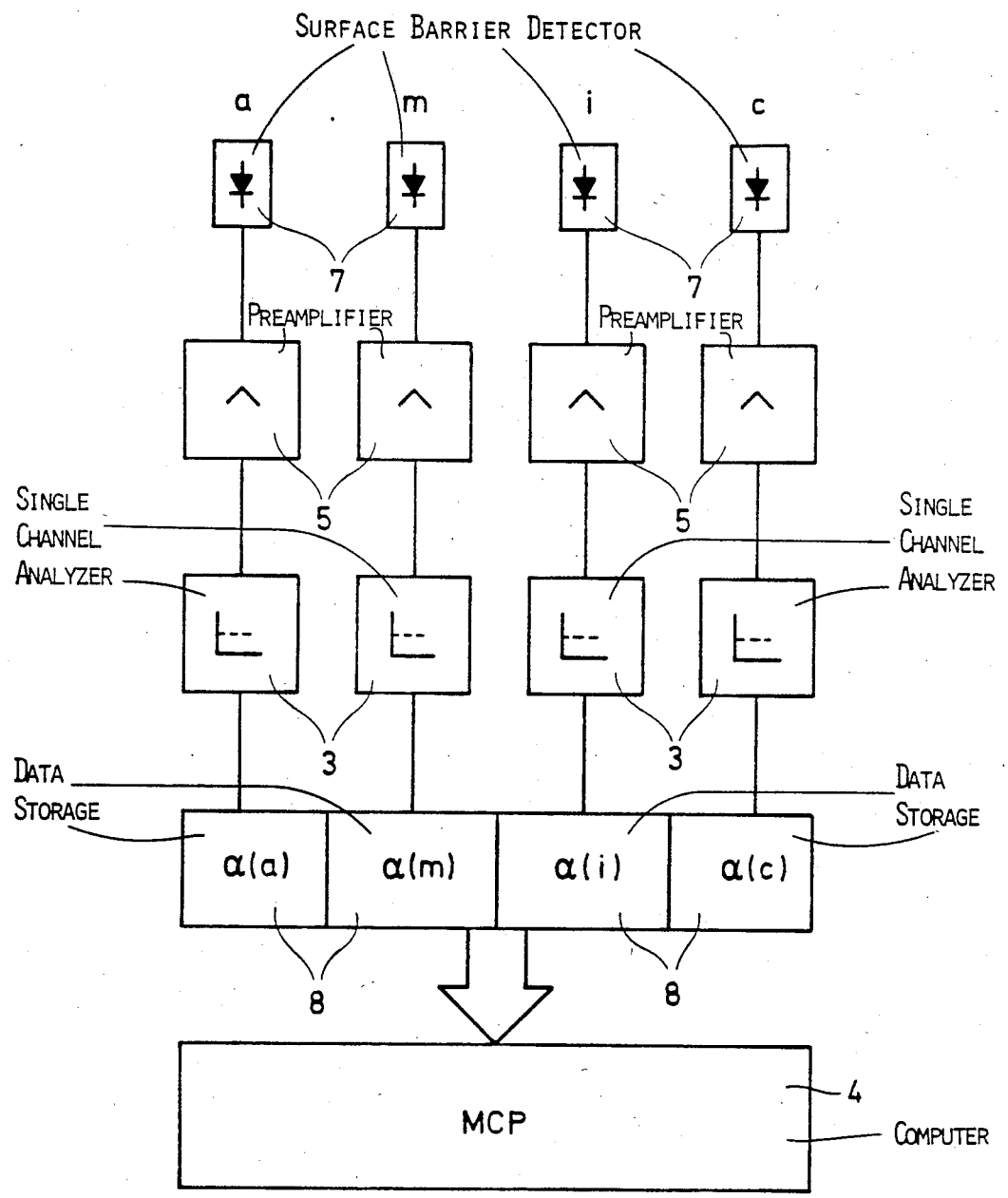
FIG. 6 is a circuit diagram of the electronic evaluation system for the display and data computation of a portable device of the single sphere albedo neutron system using active detectors.

FIG. 6 shows a complete circuit diagram of the electronic evaluation system for a single sphere albedo device using active detectors 7, i.e. the surface barrier detectors a, m, i and c. Each detector in the front and rear locations at the surface of the moderator sphere makes use of a separate pre-amplifier 5, a single channel analyser 3 and a data storage 8 before data evaluation in the computer 4.

It will be understood that the above description of the present invention is susceptible to various modifications, changes and adaptations, and the same are intended to be comprehended within the meaning and range of equivalents of the appended claims.

What is claimed is:

1. An apparatus for measuring dose equivalent in a stray neutron radiation field, said apparatus comprising:
   a moderator sphere having an outer surface;
   a neutron detector disposed in the center of said moderator sphere for producing a response representing a measurement of thermal neutrons in the center of the sphere;
   at least one detector combination disposed at the outer surface of said moderator sphere and including a plurality of further neutron detectors and shielding means for providing each respective detector in said plurality of detectors with a respectively different degree of shielding for the absorption of thermal neutrons, said further detectors producing separate response representing respective measurements of albedo neutrons back-scattered by said moderator sphere and incident thermal neutrons from the radiation field;
   an evaluation unit connected to receive and evaluate the responses from said detectors; and
   a movable frame supporting said moderator sphere and said evaluation unit.

2. An apparatus as defined in claim 1, wherein two said detector combinations having correspondingly shielded further detectors are disposed at the outer surface of said moderator sphere at diametrically opposite locations relative to one another, and the response produced by each said further detector is in the form of a count rate.

3. An apparatus as defined in claim 2, wherein said moderator sphere has front and rear locations, each of said two detector combinations is disposed at a respective one of the front and rear locations, and said evaluation unit includes means for forming a sum of the count rates for each of said correspondingly shielded further detectors disposed at said front and rear locations and for selectively displaying the sums of the count rates.

4. An apparatus as defined in claim 2, wherein said moderator sphere has front and rear locations, each of said two detector combinations is disposed at a respective one of the front and rear locations, and said evaluation unit includes means for forming a quotient of the count rates for each of said correspondingly shielded further detectors disposed at said front and rear locations and for selectively displaying the quotients of the count rates.

5. An apparatus as defined in claim 1, wherein one of said further detectors is an albedo detector and said evaluation unit includes means for selectively determining, for at least partial energy ranges of the dose equivalent, the effective neutron energy for fast neutrons, the response of said albedo detector and, via a linear measured value combination of the indications of individual detectors, the neutron fluence and the absorbed dose.

6. An apparatus as defined in claim 1, wherein said shielding means comprises a boron plastic absorber, and said plurality of further detectors includes a first detector having a side facing away from said moderator sphere which is covered by said boron plastic absorber, a second detector covered on all sides with parts of said boron plastic absorber and a third detector having a side facing said moderator sphere which is covered by parts of said boron plastic absorber, wherein the response rate of said first detector is a measure substantially of thermal and epithermal neutrons which, after moderation and back scattering, emanate from said moderator sphere, the response of said second detector is a measure substantially of incident epithermal neutrons from the stray radiation field and from said moderator sphere, and the response of said third detector is a measure substantially of incident thermal neutrons from the stray radiation field.

* * * * *